(12) United States Patent
Spunar et al.

(10) Patent No.: US 11,225,123 B2
(45) Date of Patent: Jan. 18, 2022

(54) HVAC CASE

(71) Applicant: DENSO International America, Inc., Southfield, MI (US)

(72) Inventors: Nicholaus Spunar, Southfield, MI (US); Brian Belanger, Farmington Hills, MI (US); Li Zhang, Ann Arbor, MI (US)

(73) Assignee: DENSO International America, Inc., Southfield, MI (US)

( * ) Notice: Subject to any disclaimer, the term of this patent is extended or adjusted under 35 U.S.C. 154(b) by 43 days.

(21) Appl. No.: 16/831,382

(22) Filed: Mar. 26, 2020

(65) Prior Publication Data

US 2021/0046799 A1 Feb. 18, 2021

Related U.S. Application Data (60) Provisional application No. 62/887,907, filed on Aug. 16, 2019.

(51) Int. Cl.
*B60H 1/00* (2006.01)
*B60S 1/54* (2006.01)

(52) U.S. Cl.
CPC ..... *B60H 1/00671* (2013.01); *B60H 1/00564* (2013.01); *B60S 1/54* (2013.01)

(58) Field of Classification Search
CPC ............... F24F 13/062; B60H 1/00671; B60H 1/00685; B60H 1/00564; B60S 1/54; F16K 11/076

USPC ......................................................... 454/127
See application file for complete search history.

(56) References Cited

U.S. PATENT DOCUMENTS

| | | | | |
|---|---|---|---|---|
| 2004/0152412 A1* | 8/2004 | Gehring | .............. | F24F 13/1426 454/153 |
| 2018/0251012 A1* | 9/2018 | Sano | .................. | B60H 1/00564 |

FOREIGN PATENT DOCUMENTS

| | | | | |
|---|---|---|---|---|
| JP | 2002240533 A | * | 8/2002 | |
| JP | 4269505 B2 | * | 5/2009 | ............... B60H 1/00 |

* cited by examiner

*Primary Examiner* — Edelmira Bosques
*Assistant Examiner* — Benjamin Trettel
(74) *Attorney, Agent, or Firm* — Harness, Dickey & Pierce, P.L.C.

(57) ABSTRACT

An HVAC case for a vehicle including an airflow outlet defining a first outlet area having a first width and a first depth, and a second outlet area having a second width and a second depth. The first outlet area is larger than the second outlet area. A ramped surface is adjacent to the second outlet area. An airflow control door is movable to an open position, a partially closed position in which the airflow control door obstructs airflow through the first outlet area and permits airflow through the second outlet area, and a fully closed position in which the airflow control door obstructs airflow through both the first outlet area and the second outlet area.

19 Claims, 6 Drawing Sheets

HVAC CASE

CROSS-REFERENCE TO RELATED APPLICATION

This application claims the benefit of U.S. Provisional Application No. 62/887,907 filed on Aug. 16, 2019, the entire disclosure of which is incorporated herein by reference.

FIELD

The present disclosure relates to a heating, ventilation, and air conditioning (HVAC) case for an HVAC system.

BACKGROUND

This section provides background information related to the present disclosure, which is not necessarily prior art.

HVAC cases often define paired outlets, such as a defrost outlet paired with a demist outlet. Some HVAC systems call for airflow distributions between the defrost outlet and the demist outlet that are not scaled the same between different modes. For example, in two different modes the defrost/demist call out may be, in percentage of total airflow, 50% and 20% in a first mode, and 30% and 40% in another mode. Existing HVAC cases use two doors paired together to throttle different outlets to adjust for different modes, which is a complex and costly arrangement. The present disclosure provides for an improved HVAC case that addresses these issues in the art, and provides numerous additional advantages as explained in detail herein and as one skilled in the art will recognize.

SUMMARY

This section provides a general summary of the disclosure, and is not a comprehensive disclosure of its full scope or all of its features.

The present disclosure provides for an HVAC case for a vehicle including an airflow outlet defining a first outlet area having a first width and a first depth, and a second outlet area having a second width and a second depth. The first outlet area is larger than the second outlet area. A ramped surface is adjacent to the second outlet area. An airflow control door is movable to an open position, a partially closed position in which the airflow control door obstructs airflow through the first outlet area and permits airflow through the second outlet area, and a fully closed position in which the airflow control door obstructs airflow through both the first outlet area and the second outlet area.

The present disclosure further provides for an HVAC case for a vehicle HVAC system configured to heat airflow for defrosting a windshield of the vehicle and demisting side windows of the vehicle. The HVAC case includes a demist outlet and a defrost outlet. The defrost outlet is adjacent to the demist outlet. The defrost outlet defines a first outlet area having a first width and a second outlet area having a second width. The second width is smaller than the first width. A first ramped portion is adjacent to the second outlet area. An airflow control door is configured to control airflow through both the demist outlet and the defrost outlet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
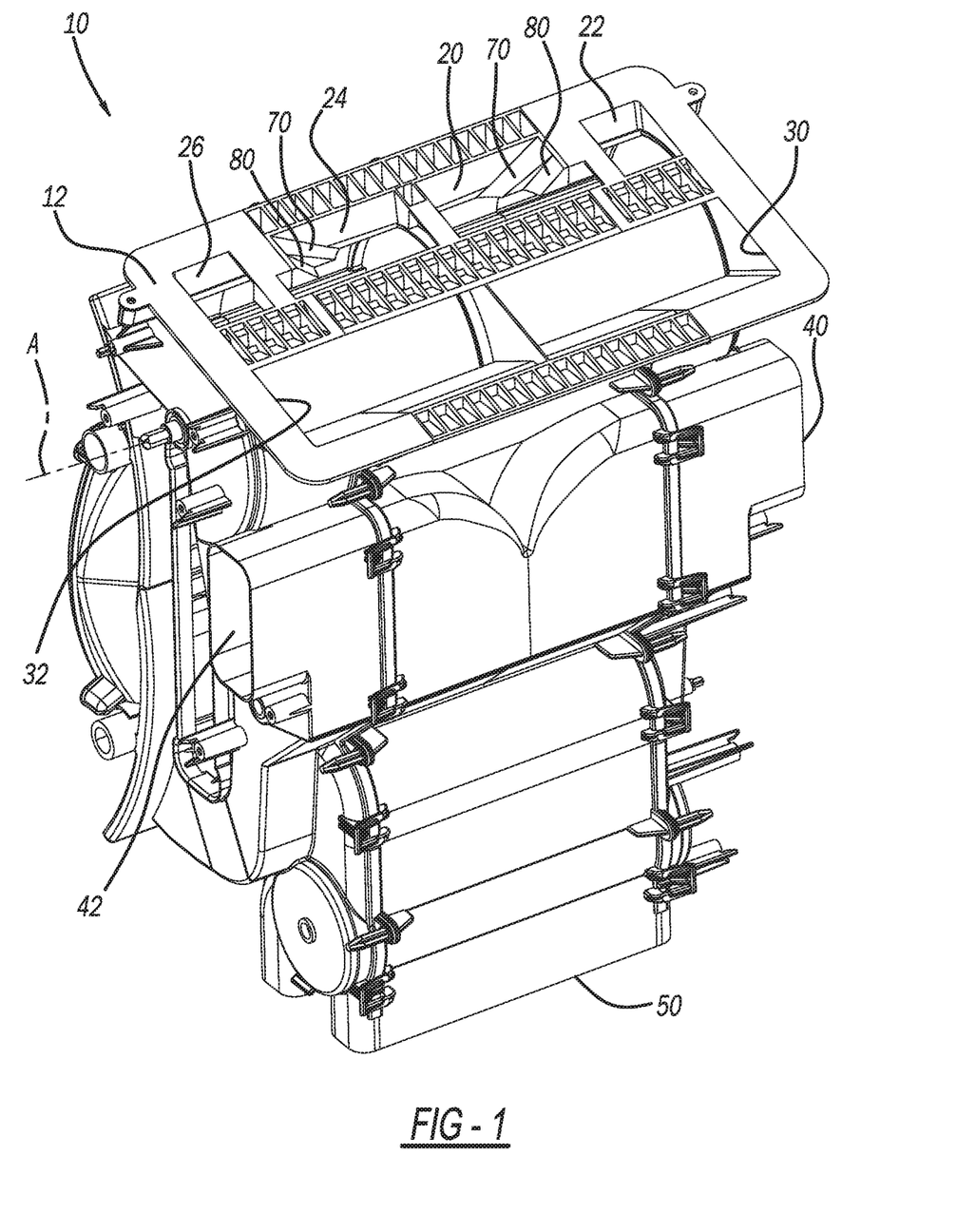
FIG. 1 is a perspective view of a heating, ventilation, and air conditioning (HVAC) case in accordance with the present disclosure.

FIG. 1 illustrates an exemplary heating, ventilation, and air conditioning (HVAC) case 10 in accordance with the present disclosure. The HVAC case 10 is configured for use with any suitable vehicle HVAC system to heat airflow. The HVAC case 10 may be installed in any suitable vehicle, such as any suitable passenger vehicle, mass transit vehicle, recreational vehicle, construction vehicle/equipment, military vehicle/equipment, watercraft, aircraft, etc. The HVAC case 10 may also be configured for use with any suitable non-vehicular application, such as any application calling for defrost and demist airflow to a window or any other suitable surface.

The HVAC case 10 includes a housing 12. Within the housing 12 is any suitable heater for heating airflow passing through the HVAC case 10, such as a heater core 14 (see FIGS. 3B, 4B, 5B and 6B). The housing 12 defines a plurality of outlets through which airflow exits the HVAC case 10. Specifically, the housing 12 defines a first defrost outlet 20 and a first demist outlet 22, which is adjacent to the first defrost outlet 20. The housing 12 may further define a second defrost outlet 24 and a second demist outlet 26, which is adjacent to the second defrost outlet 24. The second defrost outlet 24 and the second demist outlet 26 are generally configured as mirror images of the first defrost outlet 20 and the first demist outlet 22, respectively. Thus, the description herein of the first defrost outlet 20 also applies to the second defrost outlet 24, and the description of the first demist outlet 22 also applies to the second demist outlet 26.

The first defrost outlet 20 and the second defrost outlet 24 direct heated airflow to a windshield of the vehicle in order to defrost the windshield. The first demist outlet 22 and the second demist outlet 26 direct heated airflow to side windows of the vehicle to demist the side windows. The first and second defrost outlets 20, 24 and the first and second demist outlets 22, 26 may alternatively be configured to direct heated airflow to any other suitable surface and/or area as well.

The housing 12 further defines a first face outlet 30 and a second face outlet 32. The first and second face outlets 30, 32 direct airflow to an upper area of the vehicle passenger cabin, such as towards the faces of occupants of the passenger cabin. Airflow exiting the first and second face outlets 30, 32 may flow directly to the passenger cabin or through any suitable tubes or other conduits leading to the passenger cabin.

The housing 12 further defines a first foot outlet 40 and a second foot outlet 42. The first and second foot outlets 40, 42 direct airflow to a lower area of the passenger cabin, such as towards the feet of occupants of the passenger cabin. The first and second foot outlets 40, 42 are connected to any suitable airflow conduits, such as hoses, which direct the airflow to the passenger cabin. The housing 12 also defines a rear foot outlet 50. The rear foot outlet 50 is connected to any suitable airflow conduit, such as a hose, for directing airflow to a rear area of the passenger cabin.

Figure 2:
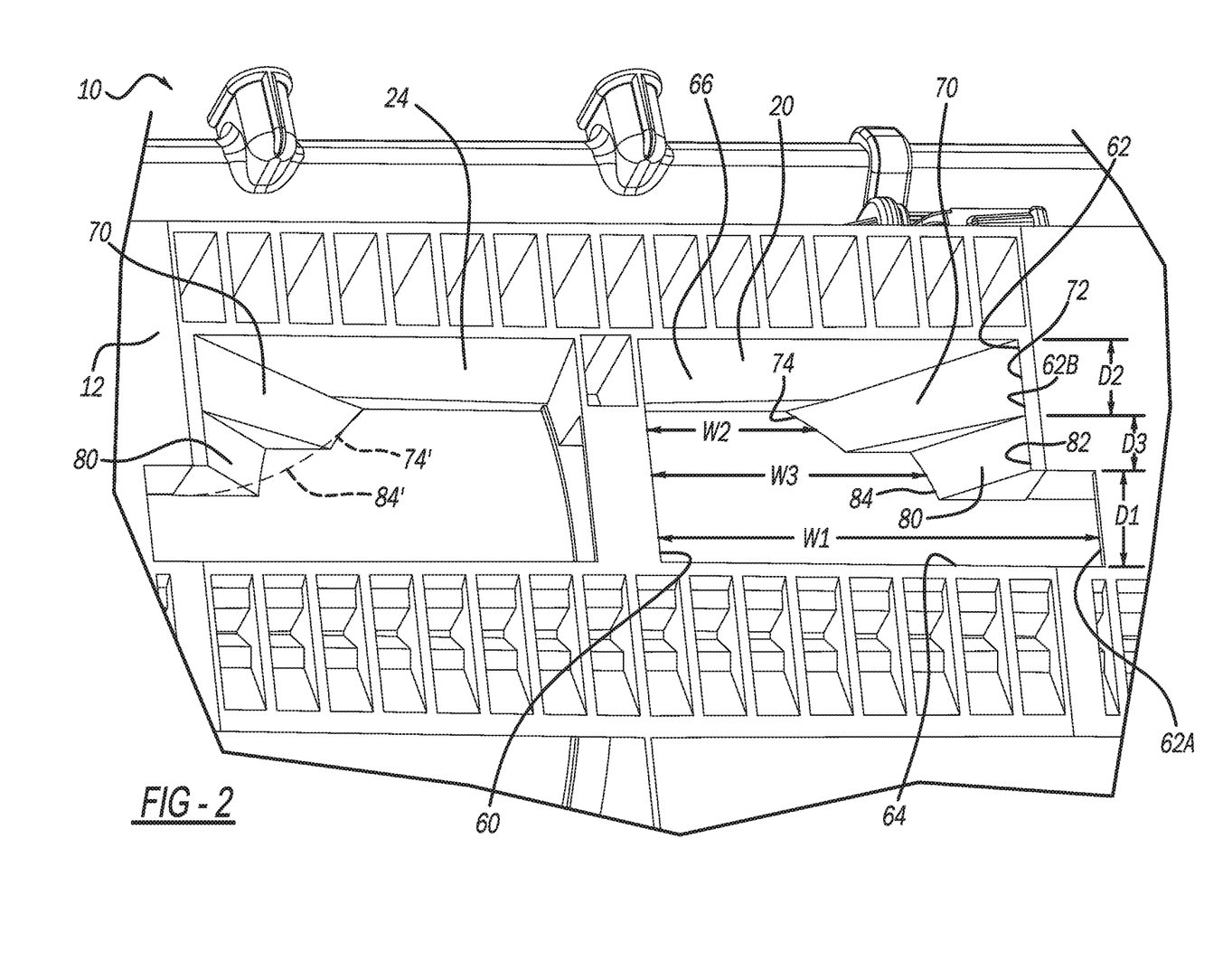
FIG. 2 is a close-up view of defrost outlets of the HVAC case of FIG. 1.

With additional reference to FIG. 2, the first defrost outlet 20 will now be described in additional detail. The description of the first defrost outlet 20 also applies to the second defrost outlet 24. The first defrost outlet 20 is generally defined by a first sidewall 60 and a second sidewall 62 that is opposite to the first sidewall 60. The second sidewall 62 has a first portion 62A and a second portion 62B, which is closer to the first sidewall 60 than the first portion 62A. The first defrost outlet 20 is further defined by a third sidewall 64 and a fourth sidewall 66, which is generally opposite to the third sidewall 64.

In the example illustrated, the first portion 62A of the second sidewall 62 is further from the first sidewall 60 than the second portion 62B. Thus, the first portion 62A and the second portion 62B are not aligned with one another. Rather, the first portion 62A is stepped further away from the first sidewall 60 than the second portion 62B. The first portion 62A and the second portion 62B extend parallel to one another.

Extending from the second portion 62B of the second sidewall 62 is a first ramped surface 70 and a second ramped surface 80. The first ramped surface 70 and the second ramped surface 80 may each have any suitable length, slope, and shape. In the example illustrated, the first ramped surface 70 is longer than the second ramped surface 80, and the first ramped surface 70 has a slope that is more shallow than a slope of the second ramped surface 80. The first and second ramped surfaces 70, 80 direct some of the airflow exiting the first defrost outlet 20 to the side window of the vehicle. The first and second ramped surfaces 70, 80 may each have a generally rectangular shape with distinct first and second distal ends 74, 84 respectively, as described herein. Alternatively and as illustrated in phantom in FIGS. 2 and 3A, the first and second ramped surfaces 70, 80 may be a continuous ramped surface varying in slope such that first and second distal ends 74' and 84' are a continuous curved surface that varies in shape across the first and second defrost outlets 20, 24.

The volume of airflow out of the first defrost outlet 20 directed to the side window can be varied by changing the depth of the first and second ramped surfaces 70, 80. In the example of FIG. 2, the depth of the first ramped surface 70 is at D2 and the depth of the second ramped surface 80 is at D3. Making the first and/or second ramped surfaces 70, 80 deeper will increase the surface area thereof and direct relatively more airflow to the side window. Making the first and/or second ramped surfaces 70, 80 relatively more narrow will decrease the surface area thereof and direct relatively less airflow to the side window.

The distribution of airflow out of the first defrost outlet 20 to the side window, such as the height of the airflow, can be varied by changing the length and slope of the first and/or second ramped surfaces 70, 80. For example, shortening the length of the first and/or second ramped surfaces 70, 80 will increase the slope thereof and direct the airflow to a relatively higher area of the side window. Increasing the length of the first and/or second ramped surfaces 70, 80 will decrease the slope thereof and direct the airflow to a relatively lower area of the side window.

The first ramped surface 70 has a first proximal end 72 and a first distal end 74. The first proximal end 72 is at the second portion 62B of the second sidewall 62. From the first proximal end 72, the first ramped surface 70 extends towards the first sidewall 60 downward and inward to the first distal end 74. The first distal end 74 is opposite to the first sidewall 60 and may extend at a nonorthogonal angle relative to the first sidewall 60 as illustrated, or parallel to the first sidewall 60.

The second ramped surface 80 includes a second proximal end 82 and a second distal end 84, which is opposite to the second proximal end 82. The second proximal end 82 is at the second portion 62B of the second sidewall 62. The second ramped surface 80 extends downward and inward from the second proximal end 82 to the second distal end 84. The second distal end 84 is opposite to the first sidewall 60. The second distal end 84 is illustrated as extending at a nonorthogonal angle relative to the first sidewall 60, however the second distal end 84 may alternatively be configured to extend parallel to the first sidewall 60. Although the first defrost outlet 20 is illustrated as including two ramped surfaces 70, 80, the first defrost outlet 20 may include a single ramped surface, or more than two ramped surfaces.

The first defrost outlet 20 defines any suitable number of outlet areas each having different widths and depths. In the example illustrated, the first defrost outlet 20 defines three outlet areas. However, the first defrost outlet 20 may be configured to define any suitable number of outlet areas, such as two or more than three outlet areas. In the example illustrated, the first defrost outlet 20 defines a first outlet area having a first width W1 and first depth D1. The first width W1 extends between the first sidewall 60 and the first portion 62A of the second sidewall 62. The first depth D1 extends from the third sidewall 64 to an edge of the first portion 62A that is furthest from the third sidewall 64.

The first defrost outlet 20 further defines a second outlet area having a second width W2 and the second depth D2. The second width W2 extends from the first sidewall 60 to the first distal end 74 of the first ramped surface 70, such as to a midpoint of the first distal end 74. The second depth D2 is equal to, or generally equal to, a depth of the ramped surface 70.

The defrost outlet 20 still further defines a third outlet area. The third outlet area has a third width W3 and the third depth D3. The third width W3 extends from the first sidewall 60 to the second distal end 84 of the second ramped surface 80, such as to a midpoint of the second distal end 84. The third depth D3 is equal to, or generally equal to, a depth of the second ramped surface 80.

Each one of the widths W1, W2, W3 and each one of the depths D1, D2, and D3 may be varied to provide a desired volume and distribution of airflow from the first defrost outlet 20. For example, increasing or decreasing the distance between the first sidewall 60 and the first portion 62A of the second sidewall 62 will relatively increase or decrease the width W1 of the first outlet area. Increasing or decreasing the distance between the first distal end 74 of the first ramped surface 70 and the first sidewall 60 will relatively increase or decrease the second width W2 of the second outlet area. Increasing or decreasing the distance between the second distal end 84 of the second ramped surface 80 and the first sidewall 60 will relatively increase or decrease the width W3. In the example illustrated, the first outlet area (W1, D1) has the greatest width and depth, and does not include a ramped surface. Therefore, when the first outlet area is open, a relatively large amount of airflow will flow therethrough to the windshield and little or no airflow will flow to the side window. The second outlet area (W2, D2) has the smallest area and a relatively deep and long first ramped surface 70. Thus, when the second outlet area (W2, D2) is open a relatively small amount of airflow will flow therethrough to the windshield, and a relatively large amount of airflow will flow to the side window. The third outlet area (W3, D3) has a medium sized area and a relatively narrow and shorter second ramped surface 80. Thus, when the third outlet area (W3, D3) is open an intermediate amount of airflow will flow therethrough to the windshield, and a relatively small amount of airflow will flow to the side window.

Airflow through each one of the first defrost outlet 20, the first demist outlet 22, the second defrost outlet 24, the second demist outlet 26, the first face outlet 30, and the second face outlet 32 is controlled by a single airflow control door 90 (see FIGS. 3B, 4B, 5B and 6B). The airflow control door 90 is rotatable about a rotation axis A. The airflow control door 90 may be rotated in any suitable manner, such as with any suitable servo or other device. Each one of the widths W1, W2, and W3 of the first, second, and third outlet areas extend parallel to the axis A.

Figure 3A:
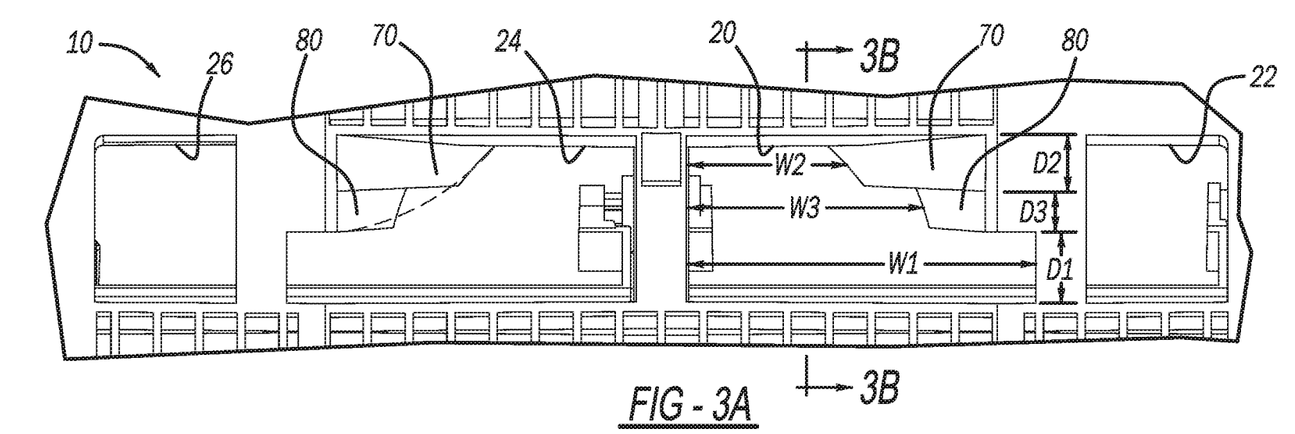
FIG. 3A is a plan view of the defrost outlets and demist outlets of the HVAC case of FIG. 1 with an airflow control door in a fully open position.
Figure 3B:
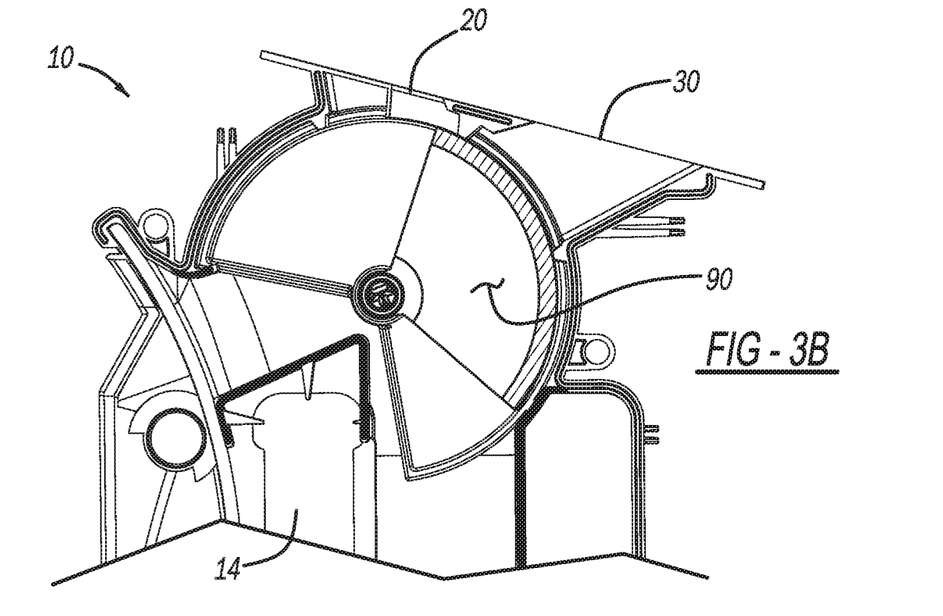
FIG. 3B is a cross-sectional view of FIG. 3A taken along line 3B-3B of FIG. 3A.

With continued reference to FIGS. 1 and 2, and additional reference to FIGS. 3A-6B, various modes of the HVAC case 10 will now be described. The airflow control door 90 is rotatable about the rotation axis A to various different positions to control airflow through the outlets 20, 22, 24, 26, 30 and 32. For example, and as illustrated in FIGS. 3A and 3B, to provide maximum defrost/demist airflow, the airflow control door 90 is rotatable about the rotation axis A to fully open each one of the first defrost outlet 20, the first demist outlet 22, the second defrost outlet 24, and the second demist outlet 26. In the maximum defrost/demist mode of FIGS. 3A and 3B, the airflow control door 90 closes the first face outlet 30 and the second face outlet 32. When the airflow control door 90 is in the maximum defrost/demist position of FIGS. 3A and 3B, heated airflow flows through the first outlet area (having width W1 and depth D1), the second outlet area (having width W2 and depth D2) and the third outlet area (having width W3 and depth D3) of first defrost outlet 20, as well as the second demist outlet 22. Airflow also flows through corresponding areas of the second defrost outlet 24 and the second demist outlet 26.

Figure 4A:
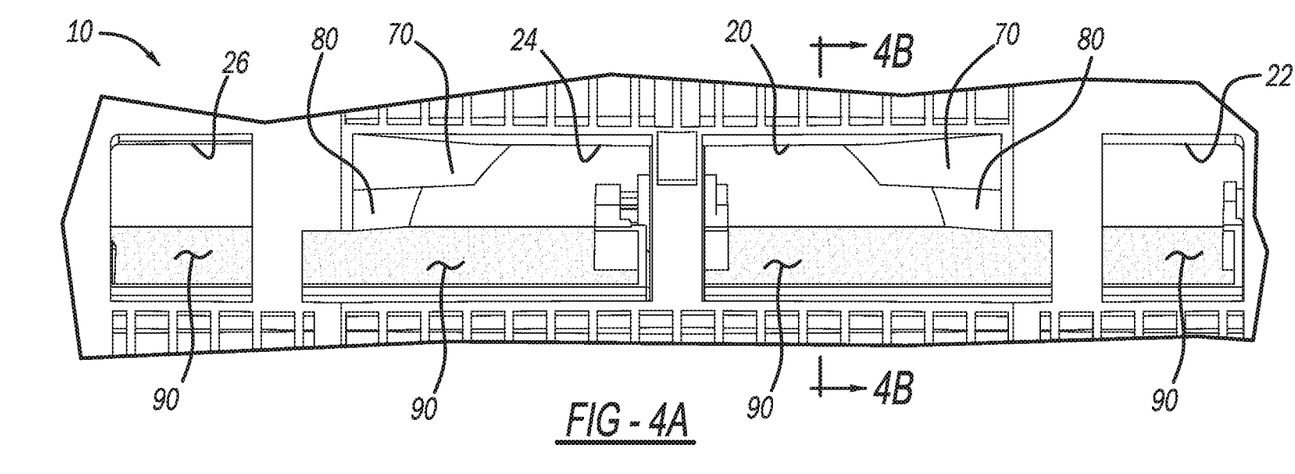
FIG. 4A is a plan view of the defrost outlets and demist outlets of the HVAC case of FIG. 1 with the airflow control door in a first partially closed position.
Figure 4B:
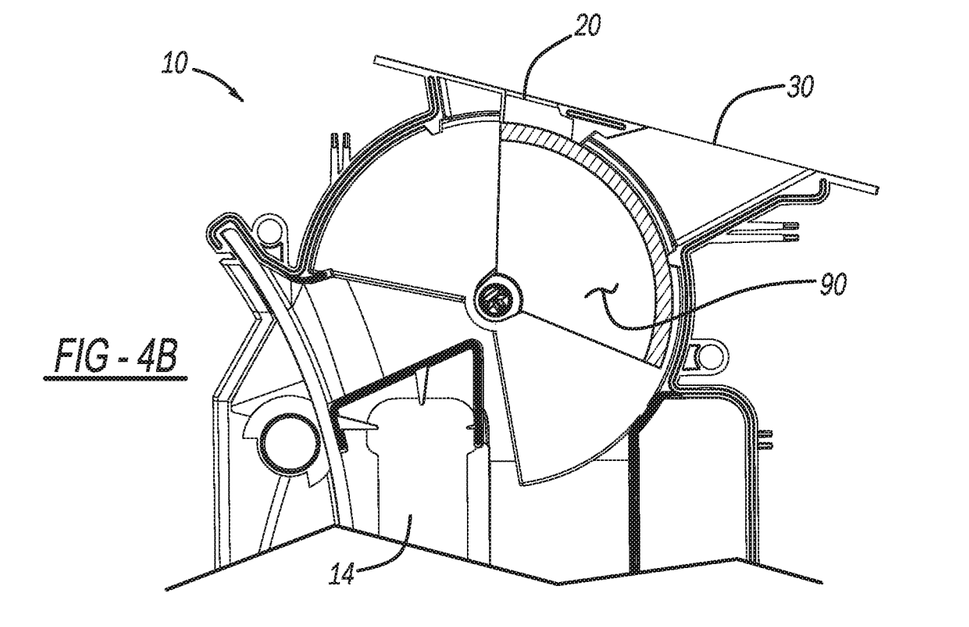
FIG. 4B is a cross-sectional view of FIG. 4A taken along line 4B-4B of FIG. 4A.

With reference to FIGS. 4A and 4B, the airflow control door 90 is movable to a first partially closed position with respect to the defrost/demist outlets 20, 22, 24, and 26. In the first partially closed position, the amount of defrost/demist airflow is reduced relative to the maximum defrost/demist position of FIGS. 3A and 3B. Specifically, the airflow control door 90 is rotated to block airflow through the first outlet area (W1, D1) of the first defrost outlet 20 and the second defrost outlet 24. The airflow control door 90 also partially obstructs the first demist outlet 22 and the second demist outlet 26 to reduce the amount of demist airflow relative to the fully opened position of FIGS. 3A and 3B.

Figure 5A:
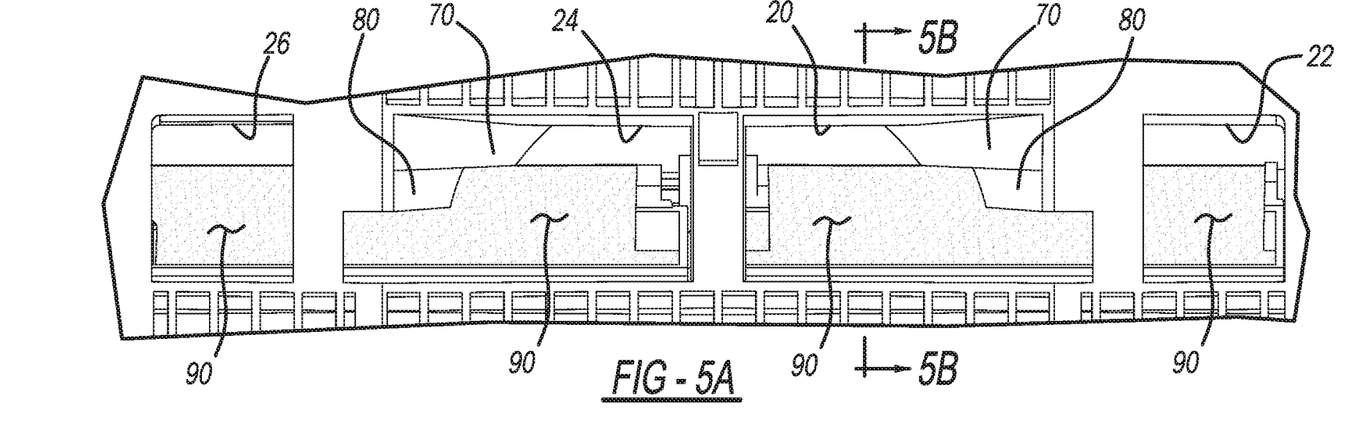
FIG. 5A is a plan view of the defrost outlets and demist outlets of the HVAC case of FIG. 1 with the airflow control door in a second partially closed position.
Figure 5B:
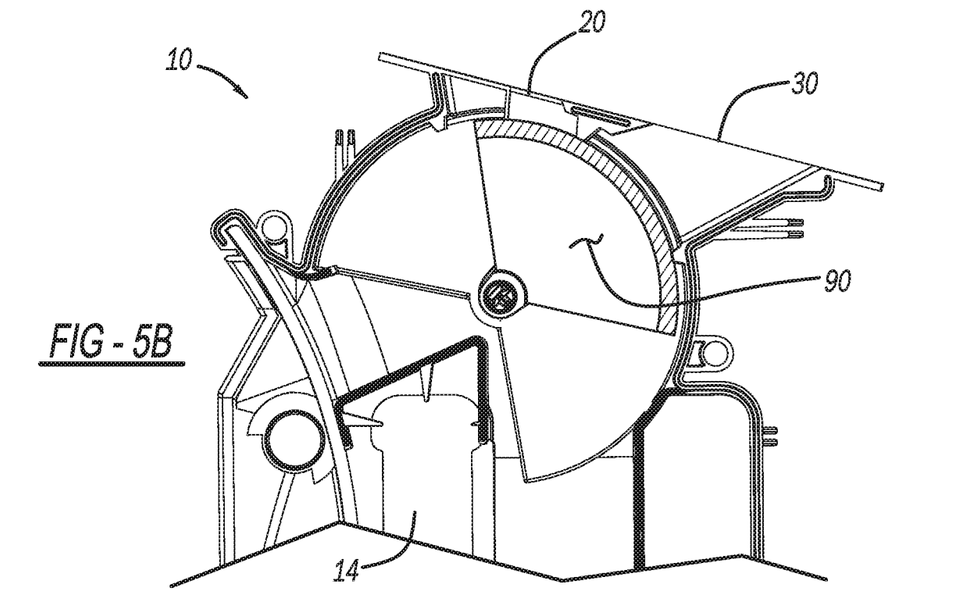
FIG. 5B is a cross-sectional view of FIG. 5A taken along line 5B-5B of FIG. 5A.

With reference to FIGS. 5A and 5B, the airflow control door 90 is rotatable to a second partially closed position at which the airflow control door 90 further obstructs airflow through each one of the outlets 20, 22, 24 and 26. In the second partially closed position, the airflow control door 90 further closes each one of the outlets 20, 22, 24, and 26 from the first partially closed position of FIGS. 4A and 4B. In the second partially closed position of FIGS. 5A and 5B, the airflow control door 90 restricts airflow through the first outlet area (W1, D1) and the third airflow area (W3, D3) of the first defrost outlet 20 and the second defrost outlet 24. Thus, in the second partially closed position, the airflow control door 90 permits airflow to flow only through the second outlet area (W2, D2) of the first defrost outlet 20 and the second defrost outlet 24. In the second partially closed position, the airflow control door 90 further closes the first demist outlet 22 and the second demist outlet 26 as compared to the first partially closed position of FIGS. 4A and 4B.

Figure 6A:
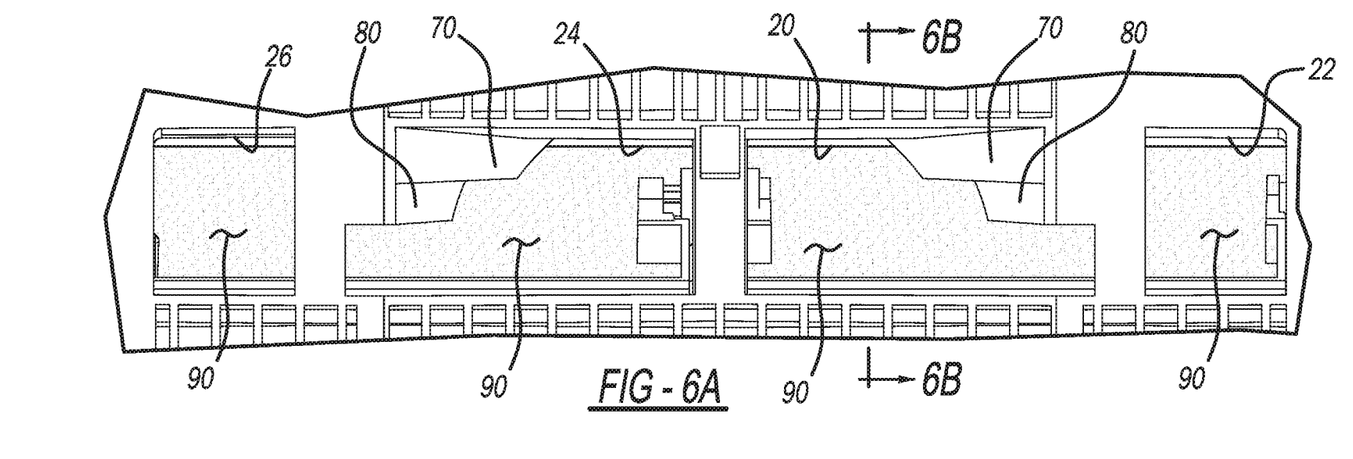
FIG. 6A is a plan view of the defrost outlets and demist outlets of the HVAC case of FIG. 1 with the airflow control door in a fully closed position.
Figure 6B:
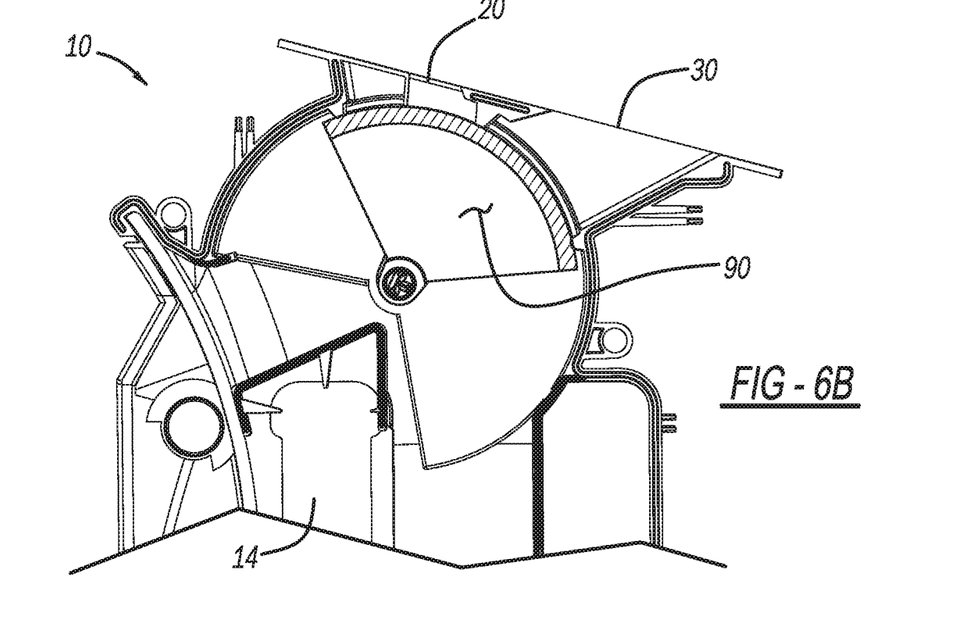
FIG. 6B is a cross-sectional view of FIG. 6A taken along line 6B-6B of FIG. 6A.

FIGS. 6A and 6B illustrate the airflow control door 90 in a fully closed position. In the fully closed position of FIGS. 6A and 6B, the airflow control door 90 closes each one of the first defrost outlet 20, the first demist outlet 22, the second defrost outlet 24, and the second demist outlet 26 to prevent airflow therethrough.

The present disclosure thus advantageously provides for the HVAC case 10 having a single airflow control door 90 configured as described above and illustrated throughout the drawings to control airflow through each one of the following airflow outlets: the first defrost outlet 20; the first demist outlet 22; the second defrost outlet 24; the second demist outlet 26; the first face outlet 30; and the second face outlet 32. Furthermore, the structure of the housing 12 at the first defrost outlet 20 and the second defrost outlet 24, in combination with the airflow control door 90, advantageously provides for increased control over airflow distribution and airflow volume to a vehicle windshield and side windows.

Specifically, when the airflow control door 90 is in the fully open position of FIGS. 3A and 3B, airflow passes through the outlets 20, 22, 24 and 26 to the windshield and side windows. An entirety of airflow through the first demist outlet 22 and the second demist outlet 26 flows to the side windows. A majority of airflow flowing through the first defrost outlet 20 and the second defrost outlet 24 flows to the windshield, but a portion of the airflow from the first and second defrost outlets 20, 24 is directed to the side windows by the first and second ramped surfaces 70, 80.

As the airflow control door 90 is moved from the fully open position to the first partially closed position of FIGS. 4A and 4B and the second partially closed position of FIGS. 5A and 5B, the ratio of airflow through the first and second defrost outlets 20, 24 to the windshield versus the side window changes. Specifically, in the first partially closed position of FIGS. 4A and 4B, a greater proportion of airflow through the first and second defrost outlets 20, 24 is directed to the side windows due to the first outlet area (W1, D1) being closed by the airflow control door 90. With the first outlet area (W1, D1) closed, all airflow through the first and second defrost outlets 20, 24 flows through the second outlet area (W2, D2) and the third outlet area (W3, D3), which direct a portion of the airflow therethrough to the side windows by way of the first and second ramped surfaces 70, 80.

When the airflow control door 90 is in the second partially closed position of FIGS. 5A and 5B, airflow through the first and second defrost outlets 20, 24 is restricted to the second outlet area (W2, D2). The second outlet area (W2, D2) directs relatively more airflow to the side windows as compared to the first and second outlet areas due to the first ramped surface 70 being relatively deeper in direction D2 than the second ramped surface 80. The second outlet area (W2, D2) thus directs relatively less airflow to the windshield due to width W2 being relatively less than the widths W1 and W3.

The ratio of airflow through the first and second defrost outlets 20, 24 to the windshield versus the side windows may be varied and customized by varying the widths W1, W2, W3, varying the lengths and depths of the first and second ramped surfaces 70, 80, and/or increasing or decreasing the number of ramped surfaces. For example, increasing the depth D1 of the first outlet area will increase the volume of airflow through the first outlet area (W1, D1) to the windshield. Increasing the depth D2 of the second outlet area (W2, D2) will increase the volume of airflow across the first ramped surface 70 to the side windows. Similarly, increasing the depth D3 of the second outlet area (W3, D3) will increase the airflow across the second ramped surface 80 to the side windows. Increasing the length of one or more of the first and second ramped surfaces 70, 80 will change the distribution of airflow across the particular ramped surface 70, 80 to the side window.

In addition to the first and second ramped surfaces 70, 80, the first and second defrost outlets 20, 24 may be provided with any suitable number of additional ramped surfaces having any suitable length and depth to achieve a particular airflow distribution and volume to the windshield and side windows. Although the first and second ramped surfaces 70, 80 are illustrated as adjacent to the first defrost outlet 20 and second defrost outlet 24, the ramped surfaces 70, 80 may be positioned at any other suitable airflow outlet as well for controlling airflow distribution and volume.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An HVAC case for a vehicle, the HVAC case comprising:
   an airflow outlet defining a first outlet area having a first width and a first depth, and a second outlet area having a second width and a second depth, the first outlet area is larger than the second outlet area;
   a ramped surface adjacent to the second outlet area; and
   an airflow control door movable to an open position, a partially closed position in which the airflow control door obstructs airflow through the first outlet area and permits airflow through the second outlet area, and a fully closed position in which the airflow control door obstructs airflow through both the first outlet area and the second outlet area;
  wherein the first width is defined by a first sidewall of the airflow outlet and a second sidewall of the airflow outlet that is opposite to the first sidewall;
  wherein the second width is defined by the first sidewall and an end of the ramped surface opposite to the first sidewall; and
  wherein the ramped surface extends from the second sidewall, and both the second sidewall and the ramped surface are at an outer side of the airflow outlet.

2. The HVAC case of claim 1, wherein the airflow outlet is a defrost outlet, a demist outlet, or a face outlet.

3. The HVAC case of claim 1, wherein the airflow outlet is a defrost outlet, and the HVAC case further includes a demist outlet adjacent the defrost outlet; and
  wherein the airflow control door is movable to control airflow through both the demist outlet and the defrost outlet.

4. The HVAC case of claim 1, wherein the ramped surface is lowest at the end of the ramped surface closest to the first sidewall.

5. The HVAC case of claim 1, wherein the first width is greater than the second width.

6. The HVAC case of claim 5, wherein the first depth is greater than the second depth.

7. The HVAC case of claim 1, wherein the first width and the second width extend parallel to an axis of rotation of the airflow control door.

8. The HVAC case of claim 1, wherein the airflow outlet further defines a third outlet area having a third width and a third depth, the third outlet area is smaller than the first outlet area and larger than the second outlet area;
  wherein the third outlet area is between the first outlet area and the second outlet area.

9. The HVAC case of claim 8, wherein the third width is smaller than the first width and greater than the second width.

10. The HVAC case of claim 9, wherein the ramped surface is a first ramped surface; and
  wherein adjacent to the third outlet area is a second ramped surface that is shorter than, and steeper than, the first ramped surface.

11. The HVAC case of claim 10, wherein the first ramped surface is continuous with the second ramped surface.

12. An HVAC case for a vehicle HVAC system configured to heat airflow for defrosting a windshield of a vehicle and demisting side windows of the vehicle, the HVAC case comprising:
  a demist outlet;
  a defrost outlet adjacent to the demist outlet, the defrost outlet defining a first outlet area having a first width and a second outlet area having a second width, the second width is smaller than the first width;
  a first ramped portion adjacent to the second outlet area, the first ramped portion is between the second outlet area and the demist outlet; and
  an airflow control door configured to control airflow through both the demist outlet and the defrost outlet;
  wherein the first width is defined by a first sidewall of the defrost outlet and a second sidewall of the defrost outlet that is opposite to the first sidewall;
  wherein the second width is defined by the first sidewall and an end of the first ramped portion opposite to the first sidewall; and
  wherein the first ramped portion extends from the second sidewall, and both the second sidewall and the first ramped portion are at an outer side of the defrost outlet between the demist outlet and the first sidewall.

13. The HVAC case of claim 12, wherein the first outlet area has a first depth and the second outlet area has a second depth, the first depth is greater than the second depth.

14. The HVAC case of claim 12, wherein the first width and the second width extend in a direction parallel to a rotational axis of the airflow control door.

15. The HVAC case of claim 12, wherein the first outlet area is between the second outlet area and a face outlet of the HVAC case; and
  wherein the airflow control door is further configured to control airflow through the face outlet.

16. The HVAC case of claim 12, wherein the second outlet area is defined between the first ramped portion and the first sidewall of the defrost outlet opposite to the first ramped portion;
  wherein the first ramped portion slopes downward towards the first sidewall.

17. The HVAC case of claim 16, wherein the defrost outlet further defines a third outlet area having a third width that is less than the first width and greater than the second width;
  wherein the third outlet area is defined between a second ramped portion and the first sidewall of the defrost outlet, the second ramped portion is continuous with, and shorter than, the first ramped portion.

18. The HVAC case of claim 17, wherein the airflow control door is movable to:
  a fully open position generally not obstructing airflow through both the defrost outlet and the demist outlet;
  a first partially closed position in which the airflow control door blocks airflow from passing through the first outlet area and is spaced apart from both the second outlet area and the third outlet area, and the airflow control door blocks airflow from passing through a first area of the demist outlet;
  a second partially closed position in which the airflow control door blocks airflow from flowing through both the first outlet area and the third outlet area, and the airflow control door blocks airflow from passing through the first area and a second area of the demist outlet; and
  a fully closed position entirely closing the demist outlet and the defrost outlet.

19. An HVAC case for a vehicle HVAC system configured to heat airflow for defrosting a windshield of a vehicle and demisting side windows of the vehicle, the HVAC case comprising:
  a demist outlet;
  a defrost outlet adjacent to the demist outlet, the defrost outlet defining a first outlet area having a first width defined by a first sidewall of the defrost outlet and a second sidewall of the defrost outlet that is opposite to the first sidewall, a second outlet area having a second width, and a third outlet area having a third width, wherein the second width is smaller than the first width, the third width is less than the first width and greater than the second width;
  a first ramped portion adjacent to the second outlet area, the first ramped portion slopes downward towards the first sidewall, the second outlet area is defined by the first sidewall and an end of the first ramped portion opposite to the first sidewall;

a second ramped portion adjacent to the third outlet area, the second ramped portion slopes downward towards the first sidewall, the third outlet area is defined by the first sidewall and an end of the second ramped portion opposite to the first sidewall, the second ramped portion is continuous with and shorter than the first ramped portion; and an airflow control door configured to control airflow through both the demist outlet and the defrost outlet; and wherein the airflow control door is movable to:
- a fully open position generally not obstructing airflow through both the defrost outlet and the demist outlet;
- a first partially closed position in which the airflow control door blocks airflow from passing through the first outlet area and is spaced apart from both the second outlet area and the third outlet area, and the airflow control door blocks airflow from passing through a first area of the demist outlet;
- a second partially closed position in which the airflow control door blocks airflow from flowing through both the first outlet area and the third outlet area, and the airflow control door blocks airflow from passing through the first area and a second area of the demist outlet; and
- a fully closed position entirely closing the demist outlet and the defrost outlet.

\* \* \* \* \*